United States Patent [19]
Even

[11] Patent Number: 6,091,723
[45] Date of Patent: Jul. 18, 2000

[54] SORTING NETWORKS HAVING IMPROVED LAYOUTS

[75] Inventor: Shimon Even, Watchung, N.J.

[73] Assignee: Lucent Technologies, Inc., Murray Hill, N.J.

[21] Appl. No.: 08/956,061

[22] Filed: Oct. 22, 1997

[51] Int. Cl.[7] .......................... H04L 12/28; H04L 12/50; H04Q 19/00
[52] U.S. Cl. ...................... 370/386; 370/411; 340/825.79
[58] Field of Search ...................................... 370/398, 389, 370/396, 411, 254, 422, 429, 367, 386, 387, 388; 340/825.79, 825.8, 825.89

[56] References Cited

U.S. PATENT DOCUMENTS

| | | | |
|---|---|---|---|
| 4,910,730 | 3/1990 | Day, Jr. et al. | 370/60 |
| 5,130,976 | 7/1992 | Hickey et al. | 370/60 |
| 5,216,420 | 6/1993 | Munter | 340/825.79 |
| 5,392,279 | 2/1995 | Taniguchi | 370/60 |
| 5,856,977 | 1/1999 | Yang et al. | 370/411 |
| 5,963,554 | 10/1999 | Song | 370/395 |

*Primary Examiner*—Alpus H. Hsu
*Assistant Examiner*—Duc Ho

[57] ABSTRACT

Improved layouts for sorting networks having $o(N^2)$ comparison circuits, a method therefor, and improved switches incorporating such layouts, are disclosed. An improved layout reduces grid-area requirements for Batcher's odd-even sorting network to an area of $3N^2$ grid units. The improved layout results from (i) arranging the comparison circuits comprising the network in one or more "cones," (ii) "slanting" a substantial portion of the interconnections or links so that they extend in a substantially non-orthogonal direction to the axes of a coordinate system such as is typically used in defining a grid for laying out a sorting network, and (iii) using channel linking for exiting a cone and for combining appropriate outputs from the exited cone in subsequent cones.

19 Claims, 7 Drawing Sheets

SORTING NETWORKS HAVING IMPROVED LAYOUTS

FIELD OF THE INVENTION

The present invention relates to sorting networks. More particularly, the invention relates to a reduced-area layout for sorting networks.

BACKGROUND OF THE INVENTION

Sorting networks are useful as fast circuits for performing data sorting. Sorting networks consist of input terminals, a plurality of comparison circuits, interconnections or links and output terminals. A comparison circuit is operable to compare two values appearing at its inputs and to route them to respective outputs based on those values. For example, the lesser of the two values may be directed to a predetermined first output and the greater of the two values may be directed to a predetermined second output of the comparison circuit. Sorting networks are useable, for example, in conjunction with parallel processing for computers, and as message routers for sorting messages such as in data and telecommunication networks.

It is desirable to implement sorting networks into an ever-decreasing area within an electrical circuit. Decreasing the comparison circuit count may help in minimizing sorting network layout area. The earliest sorting networks required $(N)^2/2$ comparison circuits, where N is the number of signals to be sorted and routed. That requirement was significantly decreased in an "odd-even" sorting network attributed to K. Batcher requiring $n(n-1)2^{n-2}+2^n-1$ comparison circuits, where $N=2^n$. See, K. Batcher, "Sorting Networks and their Applications," Proc. AFIPS Spring Joint Computing Conf., vol. 32, pp. 307–314, 1968.

The area required for a sorting network is not, however, necessarily controlled by the number of comparison circuits in the network. An additional important consideration is the area required for the interconnects, e.g., wires or the like, linking the various elements of the sorting network. As such, the physical layout of a sorting network may be of paramount importance in minimizing area requirements.

SUMMARY OF THE INVENTION

The present invention is directed to a method for laying out a sorting network, and to sorting network layouts resulting therefrom. The area required for implementing a network can be determined by developing a grid layout for the network. The grid layout encompasses the various interconnect permutations required within the network.

It is known that Batcher's odd-even network can be implemented in an area of $O(N^2)$ grid units. U.S. patent application Ser. No. 08/889,632, incorporated by reference herein, discloses using a channel-routing technique developed by R. Pinter for developing a grid layout. According to Pinter's technique, a maximum of N+1 grid rows are required for interconnecting N outputs to N inputs. A "straightforward" application of Pinter's technique to Batcher's odd-even sorting network results in an upper bound grid area of $12 N^2+o(N)^2$ grid units. The aforementioned patent application further discloses a network layout, and a method therefor, whereby Batcher's odd-even sorting network is implemented with an upper bound grid area of $9.375 N^2+o(N)^2$ grid units.

Using a method according to the present invention, Batcher's odd-even sorting network can be laid-out in an area of $3N^2$ or fewer grid units for a network of N inputs. According to the present method, the comparison circuits comprising the network are arranged into one or more substantially triangularly-shaped groups referred to herein as "cones." A "primary" cone consists of N-1 comparison circuits arranged in a triangularly-shaped grouping and having a symmetry axis aligned between input N/2 and N/2+1, i.e., along the midpoint of the N inputs. Comparison circuits not included in the primary cone are arranged in other cones containing fewer comparison circuits than the primary cone and having other symmetry axes. The arrangement of sorting network comparison circuits into such triangularly-shaped groupings was hitherto unknown.

Moreover, unlike conventional sorting network layouts, a substantial portion of each link interconnecting the inputs and outputs of all comparison circuits is "slanted," such as, for example, by 45°, relative to conventional layouts. In another modification, "channel linking" is used to conduct signals between cones and to bring such signals together, according to the network definition, in a first column of comparison circuits within such cones. Such an arrangement of comparison circuits provides a layout requiring significantly less grid area than conventional layouts of Batcher's odd-even network.

BRIEF DESCRIPTION OF THE DRAWINGS

Further features of the invention will become more apparent from the following detailed description of specific embodiments thereof when read in conjunction with the accompanying drawings, in which.

DETAILED DESCRIPTION OF THE INVENTION

An exemplary sorting network has N input terminals and N output terminals and a plurality of comparison circuits and interconnects or links. If N signals, representing N values, such as, for example, real numbers or address values, are fed into the input terminals, the same signals appear sorted on the output terminals. Sorting networks can be implemented to process electronic, optical or other types of signals. It will be appreciated that the physical implementation of the network will vary depending upon the signal-type being processed, e.g., electronic, optical.

Figure 1:
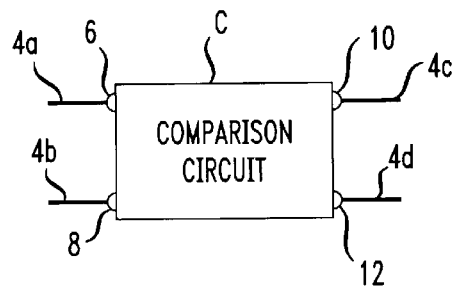
FIG. 1 shows a simplified illustration of a comparison circuit C.

FIG. 1 shows a simplified illustration of a comparison circuit C. A comparison circuit contains logic circuits, memory cells and the like, as described in Weste et al.,

*Principles of CMOS VLSI Design*, Section 9.4, (Addison-Wesley, 1985). That publication, and all others mentioned in this specification are incorporated by reference herein. A comparison circuit, such as the comparison circuit C, is operable to sort two signals. For clarity and ease of presentation, such signals will hereinafter be referred to as "numbers." Further, as used herein, the term "vector" is defined as a sequence of signals.

The comparison circuit C has two input terminals 6, 8 and two output terminals 10, 12, as illustrated in FIG. 1. If two numbers x, y are fed to the two inputs 6, 8, the same numbers x, y emerge sorted on the output terminals 10, 12. It is assumed herein that the number, say x, having the smaller value emerges upwardly, i.e., on terminal 10 in FIG. 1, and the number, y, having the larger value emerges downwardly, i.e., on terminal 12. To simplify the following description, designations for numbers (signals) delivered to the terminals, and the terminals receiving such numbers, will be used interchangeably.

The networks described herein also have fixed interconnects or links, such as the fixed interconnects 4a–d shown in FIG. 1. Such interconnects are normally implemented, for example, as conductive traces patterned on and throughout integrated circuits, or as optical waveguides in optical circuits. All such interconnects are directed links connecting a network input terminal, not shown, or a comparison circuit output terminal to a comparison circuit input terminal, or a network output terminal, not shown.

A grid can be used to assist in laying out a network. As defined herein, a grid consists of a first and a second set of straight lines. In each of such sets, the lines are parallel. It is assumed herein that the distance between any two adjacent parallel lines is the same as the distance between any other two adjacent parallel lines, though such distance can vary. That distance is assumed to be equal to one unit, referred to herein as a "grid segment." Moreover, the lines of the first set may lie in any non-zero angle with respect to the lines of the second set. For clarity of presentation, that angle is assumed herein to be ninety degrees, i.e., the lines of the first set are orthogonal to those of the second set. Based on the foregoing assumptions, the grid is a square. The grid points are the points of intersections of the lines of the first set with the lines of the second set.

Figure 2:
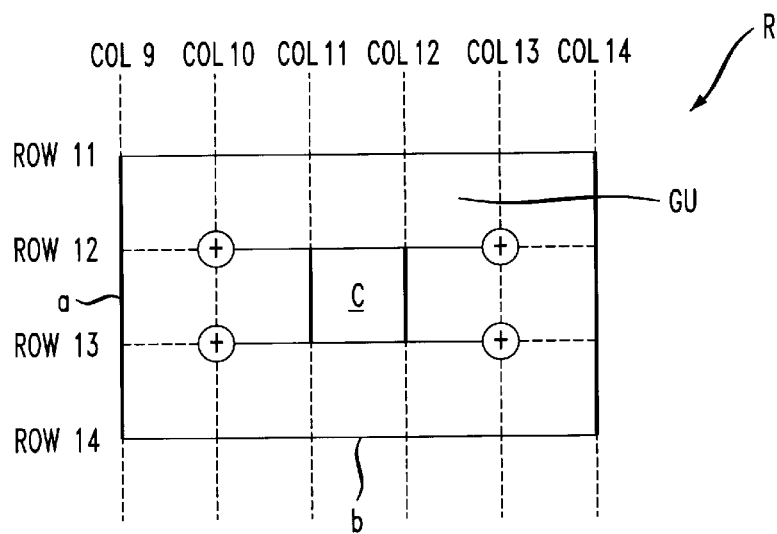
FIG. 2 shows a portion of an exemplary grid for laying out a network and a representation of grid area.

FIG. 2 shows a portion of such a grid. For clarity of presentation, in the grid portion shown, the first and second sets of straight lines are oriented vertically as "grid columns," and horizontally as "grid rows." The grid portion shown is defined by grid columns col9–col14 and grid rows row11–row14. Two adjacent grid columns, such as col12 and col13, intersect two adjacent grid rows, such as row11 and row12, defining a unit area GU of the grid. For example, the grid area encompassed by a region bounded by grid columns col9–col14 (side a), and grid rows row11–row14 (side b) is fifteen grid units (GU).

It should be understood that a grid unit GU is not arbitrarily small. A grid unit has a minimum size dictated by the state-of-the-art in device fabrication, particularly in terms of minimum feature size, prevailing at any given point in time. For example, assume it is determined that a sorting network requires an area of G grid units. It will be appreciated that the absolute area, as measured in square microns or square millimeters, required to implement such a network using technology current in, say 1970, is significantly greater than the area required for implementation using technology current in 1997. The layout areas presented herein are described in terms of "grid units." It should now be appreciated that a grid unit is a relative measure, and not an absolute measure, of layout area.

Semiconductor chips are typically laid out in rectangular regions. Thus, the area required for a layout of a switching network is the area (measured in grid units) of the smallest rectangle that contains such a layout. The grid area of a layout is defined as the least number of grid units in a rectangle that encompasses the layout.

If R is an a×b rectangle, then rectangle R contains at least $[(a-1) \cdot (b-1)]-1$ grid points and at most $(a+1) \cdot (b+1)$ grid points, no matter how the rectangle R is oriented with respect to the grid. For example, for the rectangle R shown in FIG. 2, a=3 vertical grid segments and b=5 horizontal grid segments, and the number of grid points encompassed by R is $(3+1) \cdot (5+1)=24$. The sides of R need not be parallel to the grid lines and the quantities a and b need not be integers. When a and b are large, the number of grid points is approximately equal to the area of the rectangle in grid units.

It is possible to represent a switching network by a directed graph, wherein switching circuits and network terminals are considered to be vertices, and the interconnects or links are directed edges. The following rules and definitions will be used herein with regard to embedding such a graph in a grid. First, the vertices of a graph are mapped to grid-points, with no more than one vertex per grid-point. Second, every edge of the directed graph is represented by a path in the grid, but no grid edge is used in more than one such path. Such a mapping of the graph edges to grid paths is referred to herein as "edge-disjoint" mapping. Two paths may share an intermediate grid-point, but they must cross at that point, i.e., no "knock-knee" or change in direction is allowed. Third, if a vertex is mapped to a grid-point, then all paths representing graph edges incident on this vertex must begin or end at that grid-point, and no path is allowed to pass through that point.

To facilitate description of the present invention, it will be useful to present information concerning conventional sorting network layouts. Such information is presented in Section I, below. The present invention, which is directed to improved layouts of sorting networks having $o(N^2)$ comparison circuits, such as, for example, Batcher's odd-even network, is described in Section III. The notation "o", i.e., little "o", is defined as follows: a function $f(x)$ is said to be "$o(g(x))$" if the limit, as x approaches infinity, of $f(x)/g(x)$ is equal to zero. The notation "O", i.e., big "O", is defined as follows: a function $f(x)$ is said to be "$O(g(x))$" if there exists a constant, c, such that for every x, $f(x) \leq c \cdot g(x)$.

I. Known Sorting Networks

The area of a rearrangeable network for N inputs is greater than $\frac{1}{2} (N-1)^2$ grid units. In terms of a directed graph, a network is rearrangeable if for every correspondence of the input terminals to the output terminals there are edge-disjoint directed paths connecting each input terminal with its corresponding output terminal. Every sorting network is rearrangeable.

One known sorting network having $o(N^2)$ comparison circuits is the odd-even sorting network of K. Batcher. According to the zero-one principle, if a network sorts all $2^N$ binary input vectors, then it will sort any N-vector of real numbers. The present description will refer to sorting only zeros and ones. It will be understood, however, that the network applies to any real vector. Moreover, it is assumed for the purposes of illustration that input vectors are equal in size to one another and described by powers of 2, i.e., $N=2^n$. The invention can be utilized, however, if the input vectors are unequal in size and/or are not described as a power of 2.

Figure 3:
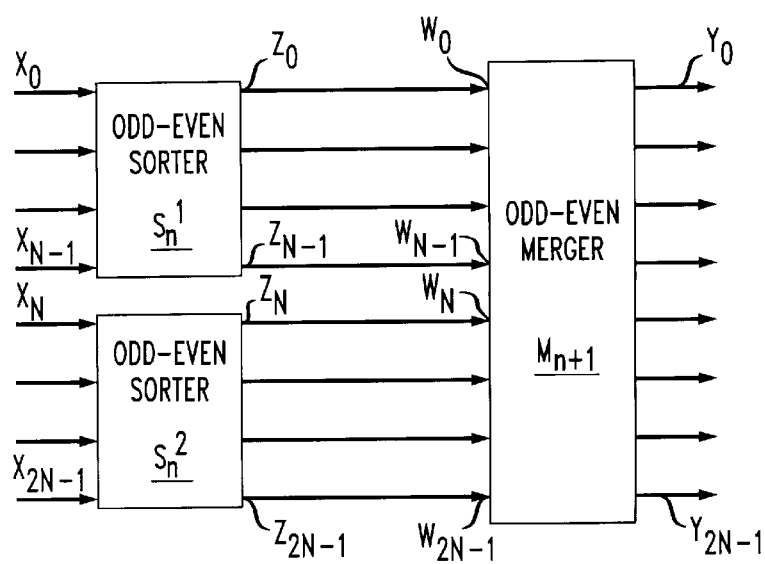
FIG. 3 shows a block diagram of Batcher's odd-even network for sorting.

FIG. 3 shows an example of Batcher's network $S_{n+1}$ for odd-even sorting. The networks described herein have a recursive structure. It will be appreciated by those skilled that explication of such recursive structure is facilitated by examining network construction and related elements in terms of the "n+1st" level.

In the example shown in FIG. 3, the network receives an input vector having 2N arbitrary inputs $x_0, x_1 \ldots x_{2N-1}$ and generates a sorted output vector $y_0, y_2 \ldots x_{2N-1}$ of size 2N. The term "arbitrary" is used herein to indicate that the inputs can be in any order, such as, for example, not sorted or sorted. For the illustration shown in FIG. 3, n=2 and N=4. The arrangement, which is constructed recursively, includes, for $S_{n+1}$, two odd-even sorters and one odd-even merger $M_{n+1}$. The two odd-even sorters include an upper odd-even sorter $S_n^1$ and a lower odd-even sorter $S_n^2$. The odd-even sorters and odd-even merger are constructed of comparison circuits. $S_1$ comprises a single comparison circuit.

Odd-even sorters, such as the upper and lower odd-even sorters $S_n^1$, $S_n^2$, receive at their inputs arbitrary vectors and deliver, at their outputs, sorted vectors. The odd-even merger $M_{n+1}$, merges the two sorted N-input vectors into a single sorted 2N-input vector.

In more detail, the 2N arbitrary inputs $x_0, x_2 \ldots x_{2N-1}$ are received by the odd-even sorters $S_n^1$, $S_n^2$, N inputs to each. The N sorted outputs $z_0, z_1 \ldots z_{N-1}$ of the odd-even sorter $S_n^1$ are delivered, in order, to the first N inputs $w_0, w_1 \ldots w_{N-1}$ of the odd-even merger $M_{n+1}$. Similarly, the N sorted outputs $z_N, z_{N+1} \ldots z_{2N-1}$ of the odd-even sorter $S_n^2$ are delivered to the second N inputs $w_N, w_{N+1} \ldots w_{2N-1}$ of the odd-even merger $M_{n+1}$ in order. Since the output vector from each odd-even sorter, $S_n^1$, $S_n^2$ is sorted, and since, as indicated above, the odd-even merger $M_{n+1}$ merges sorted input vectors, the output vector $y_1, y_2 \ldots y_{2N}$ is sorted. Further description concerning the structure of the odd-even merger $M_{n+1}$ is now provided.

Figure 4:
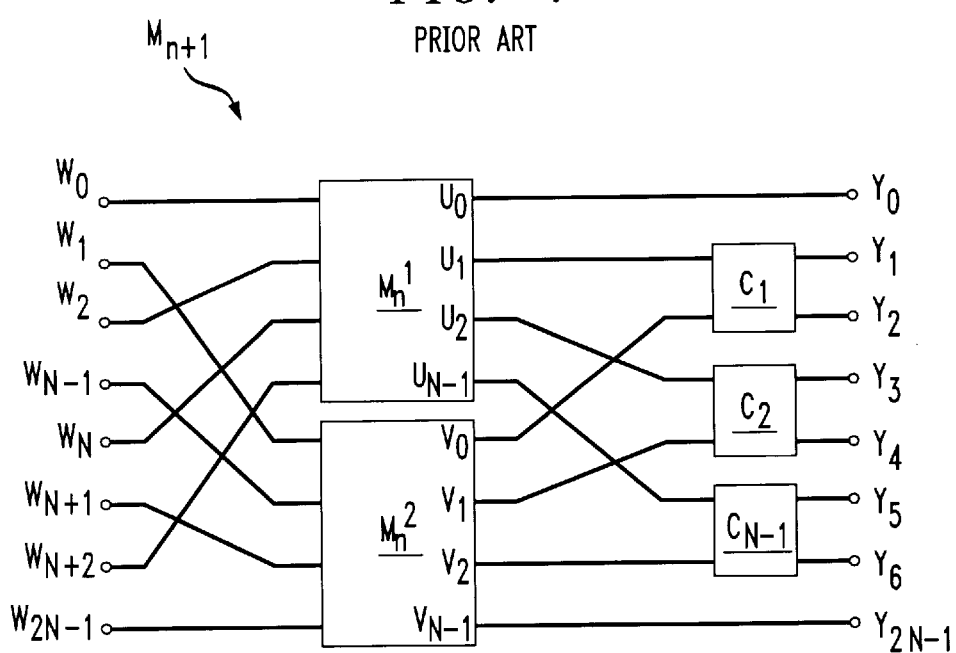
FIG. 4 shows detail of an odd-even merger, $M_{n+1}$, an element of the odd-even network.

FIG. 4 shows detail of the odd-even merger, $M_{n+1}$, which is constructed recursively. For consistency with FIG. 2, n=2 and N=4. Thus, FIG. 4 shows the merger $M_3$. The odd-even merger $M_{n+1}$ includes two mergers, an upper merger $M_n^1$ and a lower merger $M_n^2$, and (N–1) comparison circuits $C_1$, $C_2 \ldots C_{N-1}$ connected to the appropriate outputs of the upper and lower mergers, as described further below. As previously stated, the odd-even merger $M_{n+1}$ receives the input vector $w_0, w_1 \ldots w_{2N-1}$ and delivers, at its outputs, the sorted output vector $y_0, y_1 \ldots y_{2N-1}$ Inputs $w_0, w_2, \ldots, w_{N-2}$ comprise a first portion of an input vector routed to the upper merger $M_n^1$. Inputs $w_N, w_{N+2}, \ldots, w_{2N-2}$ comprise a second portion of the input vector routed to the upper merger $M_n^1$. Since, as noted above, N=4 in FIG. 4, the input vector to $M_n^1$ is $w_0, w_2, w_4$ and $w_6$. Inputs $w_1, w_3, \ldots, w_{N-1}$ comprise a first portion of an input vector routed to the lower merger $M_n^2$. Inputs $w_{N+1}, w_{N+3}, \ldots, w_{2N-1}$ comprise a second portion of the input vector routed to the lower merger $M_n^2$. Again, since N=4 in the exemplary embodiment of FIG. 4, the input vector to $M_n^2$ is $w_1, w_3, w_5$ and $w_7$.

The sorted outputs of the upper merger $M_n^1$ are denoted as $u_0, u_1, \ldots, u_{N-1}$ and the sorted outputs of the lower merger $M_n^2$ denoted as $v_0, v_1, ,v_{N-1}$. Most of the outputs from the upper and lower mergers $M_n^1$, $M_n^2$ are connected to the inputs of the aforementioned column of (N–1) comparison circuits. For the merger $M_3$ (n=2 and N=4) shown in FIG. 4, there are three comparison circuits $C_1$, $C_2$ and $C_{N-1}=C_3$.

In general, for every $1 \leq i \leq N-1$, the inputs to a comparison circuit $C_i$ are $u_i$ and $v_i$. Thus, the outputs from the upper and lower mergers $M_n^1$, $M_n^2$ are connected to the inputs of the comparison circuits as follows: $u_1$ and $v_0$ to $C_1$, $u_2$ and $v_1$ to $C_2$, and $u_{N-1}=u_3$ and $v_2$ to $C_3$. The values of the sorted output vector $y_0, y_1 \ldots y_{2N-1}$ of the merger $M_{n+1}$ correspond, respectively, to $u_0$, the outputs of $C_1, C_2, \ldots, C_{N-1}$, and $v_{N-1}$.

It was previously stated that if the input to the merger $M_{n+1}$ is two sorted vectors, the output is a sorted vector. That result is described in more detail now. If$(w_0, w_1, \ldots, w_{N-1})$ is a vector of a zeros followed by N–a ones, then $\lceil a/2 \rceil$ zeros are included in the first portion of the input vector routed to the upper merger $M_n^1$ followed by $(N/2-\lceil a/2 \rceil)$ ones. Similarly, if $(w_N, w_{N+1}, \ldots, w_{2N-1})$ is a vector of b zeros followed by N–b ones, then $\lceil b/2 \rceil$ zeros are included in the second portion of the input vector routed to the upper merger $M_n^1$. Thus, the output vector of the upper merger $M_n^1$ has $\lceil a/2 \rceil + \lceil b/2 \rceil$ zeros, followed by ones. Also, the number of zeros at the outputs of the lower merger $M_n^2$ is $\lfloor a/2 \rfloor + \lfloor b/2 \rfloor$.

If a zero is input to $M_{n+1}$, then $u_0=0=y_0$. Similarly, if a one is input into $M_{n+1}$, then $v_{N-1}=1=y_{2N-1}$. Since the number of zeros coming out of the upper merger $M_n^1$ is at least equal to the number of zeros coming out of the lower merger $M_n^2$, and is at most two higher, some comparison circuits, in the sequence from $C_1, C_2, \ldots, C_{N-1}$, receive, as input, zeros from both the upper and lower mergers $M_n^1$, $M_n^2$, followed by at most one comparison circuit that receives a zero and a one, while the remaining comparison circuits receive only ones at their inputs. Thus, if the two input vectors of $M_{n+1}$ are zero-one sorted vectors, then the 2N vector appearing at its outputs is a zero-one sorted vector.

The depth of a merger $M_n$ is n. As used herein, merger depth is equal to the maximum number of comparison circuits forming a path from input to output. The depth of the odd-even sorting network $S_n$ is $\frac{1}{2}n(n+1)$.

The number, n(m), of comparison circuits in a merger $M_n$ satisfies the recursion: $m(n+1)=2 \cdot m(n)+2^n-1$. As previously indicated, m(1)=1, thus: $m(n)=(n-1)2^{n-1}+1$.

The number, s(n), of comparison circuits in the odd-even sorting network $S_n$ satisfies the recursion: $s(n+1)=2 \cdot s(n)+m(n+1)$. And s(1)=1, thus: $s(n)=n(n-1)2^{n-2}+2^n-1$.

II. Improved Network Layouts According to the Present Invention

According to the present invention, Batcher's odd-even network can be implemented in an upper bound area of $3N^2$ grid units. In mathematical parlance, and as applied to the network area requirements, an "upper bound" area of $3N^2$ grid units means that the sorting network can be implemented in $3N^2$ or fewer grid units. Thus, in the present context, it is advantageous to reduce the upper bound. It should be appreciated, however, that many layouts of Batcher's odd-even sorting network having a grid area greater than $3N^2$ grid units fall within the intended scope of the present invention. Such layouts can be obtained, for example, by introducing any number of inefficiencies into the layout. Such inefficiencies can include, without limitation, locating one or more comparison circuits out of a preferred position or not linking comparison circuits as efficiently as possible in accordance with the present teachings.

The upper bound area of $3N^2$ grid units, which represents a significant reduction in grid-space requirements for Batcher's odd-even network, is achieved by (i) arranging the comparison circuits comprising the network in one or more "cones," (ii) "slanting" a substantial portion of the interconnections or links so that they extend in a substantially non-orthogonal direction to the column of network inputs, and (iii) using channel linking for exiting a cone and for combining appropriate outputs from the exited cone in subsequent cones. The aforementioned operations are described in more detail below.

Figure 5:
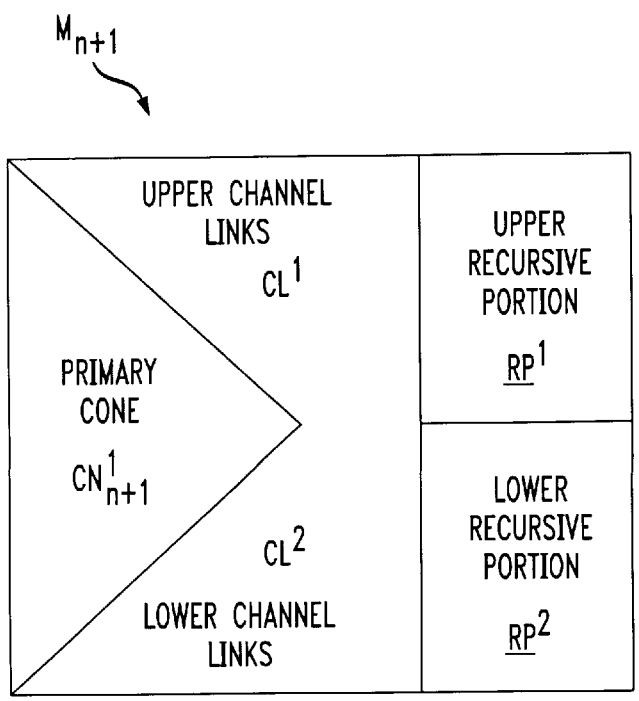
FIG. 5 shows the conceptual structural elements of a layout of an odd-even merger circuit according to the present invention.

As previously noted, there are two mergers, an upper merger $M_n^1$ and a lower merger $M_n^2$, within merger $M_{n+1}$. In addition, there are (N−1) comparison circuits $C_1, C_2 \ldots C_{n-1}$ connected to the appropriate outputs of the upper and lower mergers. That said, there are many ways to arrange the comparison circuits within each merger and to connect the (N−1) comparison circuits to the mergers. According to the present invention, those mergers and comparison circuits are arranged into several conceptual structural elements indicated in FIG. 5. Layouts in accordance with the present invention include a primary cone $CN^1_{n+1}$, upper channel links $CL^1$ and lower channel links $CL^2$, and an upper recursive portion $RP^1$ and a lower recursive portion $RP^2$ containing additional cones. Those conceptual structural elements are described further below in conjunction with FIGS. 6a–6d.

Figure 6A:
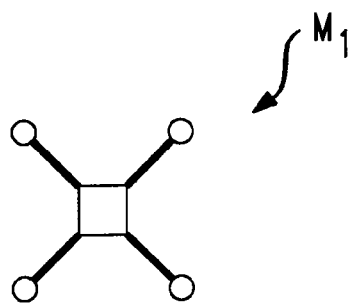
FIGS. 6a–6d show a layout according to the present invention of $M_n$ for n=1–4, respectively.
Figure 6B:
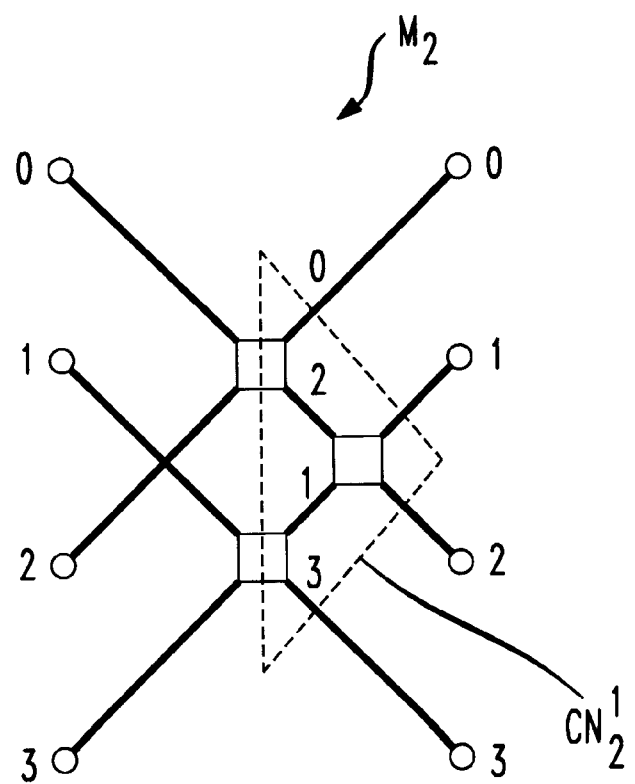
Figure 6C:
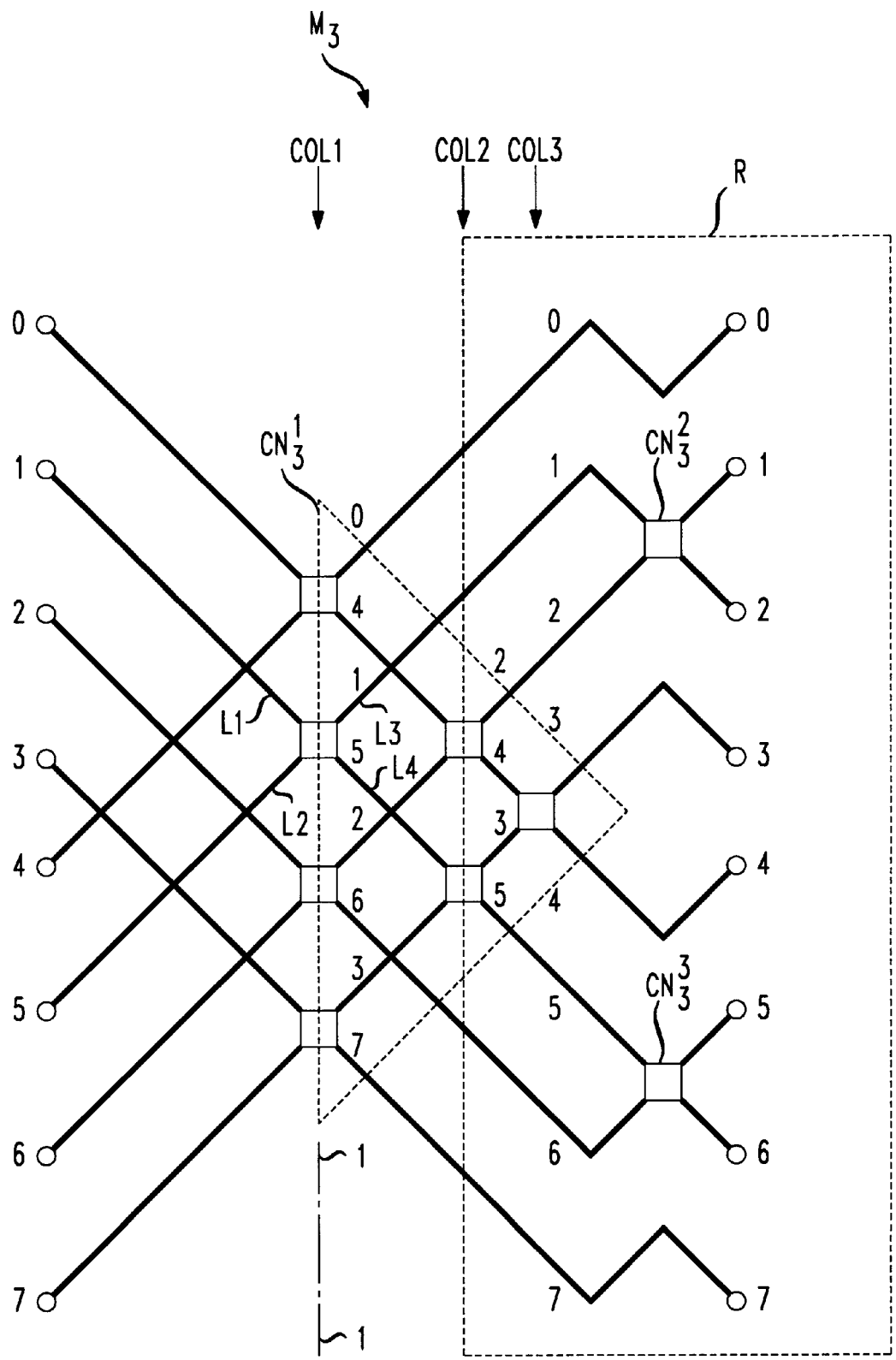

Mergers $M_1$–$M_3$, laid-out according to the present invention, are shown in FIGS. 6a–6c, respectively. $M_1$ consists of a single comparison circuit, $M_2$ consists of three comparison circuits and $M_3$ consists of nine comparison circuits. For n>1, i.e., $M_{2+}$, the comparison circuits are advantageously partitioned, in the arrangement of $M_n$, into subsets called "cones."

Figure 6D:
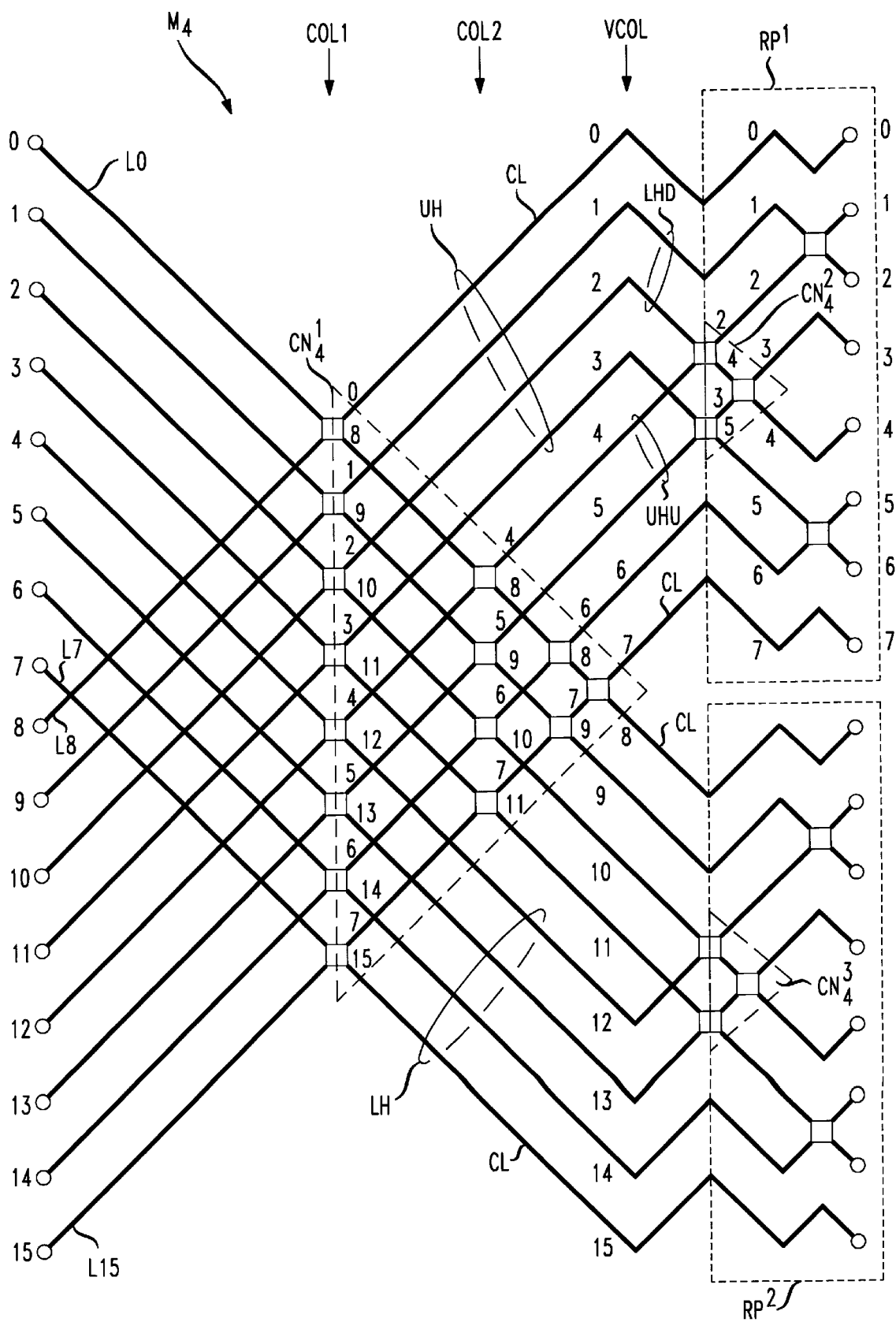

As defined herein, a primary cone $CN^1_n$ consists of a grouping of comparison circuits having a symmetry axis between line $2^{n-1}-1$ and line $2^{n-1}$ (between line N/2 and N/2+1). In other words, and as can be readily seen in FIGS. 6b–6d, the symmetry axis of the primary cone falls along a horizontal line aligned at the midpoint of the inputs. For example, in FIG. 6b, the symmetry axis can be represented as a horizontal line, not shown, placed at the midpoint between inputs 1 and 2. In FIGS. 6b–6d, dashed lines indicating the perimeter of each cone within the mergers are shown. Note that the perimeters indicated by the dashed lines have a substantially triangular or conic shape. It should be understood that the dashed line is included for clarity of presentation; it is not a feature, i.e., a link, of the merger $M_n$. Within the cones, comparison circuits are arranged in columns.

$M_2$ has only one cone since the group of comparison circuits having its symmetry axis between lines 1 and 2 includes all three of the comparison circuits in the merger $M_2$. Merger $M_3$, shown in FIG. 6c, has nine comparison circuits arranged in three cones. Primary cone $CN^1_3$ of $M_3$ is implemented in the first n (=3) columns COL1, COL2, COL3 of comparison circuits. According to the above-recited definition, the primary cone $CN^1_3$ in the merger $M_3$ includes seven ($2^{n-1}$, where n=3) of the nine comparison circuits.

In general, following the primary cone, the next two cones $CN^2_n$ and $CN^3_n$ include comparison circuits not included in the primary cone. More particularly, the second cone $CN^2_n$ is defined by a group of comparison circuits having a symmetry axis between line $2^{n-2}-1$ and line $2^{n-2}$ (between line N/4 and N/4+1). The third cone $CN^3_n$ is defined by a group of comparison circuits having a symmetry axis between lines $2^{n-1}+2^{n-2}-1$ and line $2^{n-1}+2^{n-2}$ (between line 3/4N and 3/4N+1). In the case of the merger $M_3$ shown in FIG. 6c, each of the second and third cones consists of one comparison circuit, both of which are located to the right of the primary cone $CN^1_3$ in FIG. 6c. While it takes at least three comparison circuits to define a triangular shape, i.e, a cone, as used herein, cones can be comprised of only a single comparison circuit.

Links leading to and from comparison circuits, such as the links L1–L4 shown in FIG. 6c, are "slanted" or non-orthogonal relative to the various columns of comparison circuits or the column defined by the network inputs. In some embodiments, the slant is 45 degrees.

FIG. 6d shows the merger $M_4$, with dashed lines defining the previously-mentioned structural units. The merger $M_4$ has 16 inputs ($2^n$, n=4). The merger $M_4$ includes 7 ($2^{n-1}-1$, where n=4) cones. The primary cone has now grown to include 15 ($2^n-1$, where n=4) comparison circuits.

The first column COL1 of comparison circuits is positioned at the intersection of links L1 where $0 \leq i < 2^{n-1}$, i.e., L0–L7, directed downwardly at a "slant" from respective inputs $0 \leq i < 2^{n-1}$ with links Lj, where $j = i+2^{n-1}$, i.e., L8–L15, directed upwardly at a "slant" from respective inputs L(i+ $2^{n-1}$). The upper half UH of the links directed upwardly away from the first column COL1 of comparison circuits exits primary cone $CN^1_4$ without entering another primary cone comparison circuit. More generally, the upper half of the links directed upwardly from the j-th column of comparison circuits, where $1 \leq j < n$, (there are $2^{n-j-1}$ links comprising the "upper half") exit the primary cone without entering another of the primary cone's comparison circuits. Similarly, the lower half LH of the links directed downwardly from the first column of comparison circuits exits the primary cone without entering another of its comparison circuits.

The lower half of the links directed upwardly from the outputs of the first column of comparison circuits, and the upper half of the links directed downwardly from the outputs of the first column of comparison circuits, meet, in order, in the second column COL2 of comparison circuits. More generally, the aforementioned lower half of the upwardly-directed links and the upper half of the downwardly-directed links from the outputs of the j-th column, meet in the i-th +1 column, which has $2^{n-j-1}$ comparison circuits.

The primary cone $CN^1_4$ is thus implemented in the first n (=4) columns of comparison circuits. All links in the primary cone are straight; i.e., they have no bends.

The channel links CL conduct signals out of each cone. A first group $CL^1$ of channel links comprises $2^{n-1}$ links directed upwardly on a "slant" from the primary cone. At a "virtual" column VCOL of grid-points, the upper half UH of such links, comprising $2^{n-2}$ links, are directed downwardly, while the other half of such upwardly-directed links continues without a bend. After the virtual column VCOL, a column of comparison circuits, the n-th+1 of such columns, is located at the intersection of the lower half LHD of the downwardly-directed links and the upper half UHU of the upwardly directed links. The n-th+1 column has $2^{n-3}$ comparison circuits.

The arrangement of comparison circuits within the cones lying above the symmetry axis between line $2^n-1$ and line $2^n$ of merger $M_{n+1}$ is identical to the arrangement of comparison circuits, except the first $2^{n-1}$ of such comparison circuits, of $M_n$. For example, in FIG. 6c, the portion "R," of the merger $M_3$, i.e., $M_n$, is repeated in the merger $M_4$, i.e., $M_{n+1}$, as the "recursive portion," $RP^1$. The arrangement of the lower half of $M_4$, i.e., $M_{n+1}$, is symmetric to the upper half described above. The last column of $M_n$ comprises $2^{n-2}$ comparison circuits, each a cone.

Note that the n-th+2 column of comparison circuits of $M_{n+1}$, which begins the recursive portions $RP^1$, $RP^2$, is the first column of comparison circuits belonging to the second and third cones $CN^2$, $CN^3$. All cones other than the primary cone fall within the recursive portions of $M_{n+1}$. The number of cones in the merger $M_{n+1}$ is $2^{n-1}$.

Figure 7:
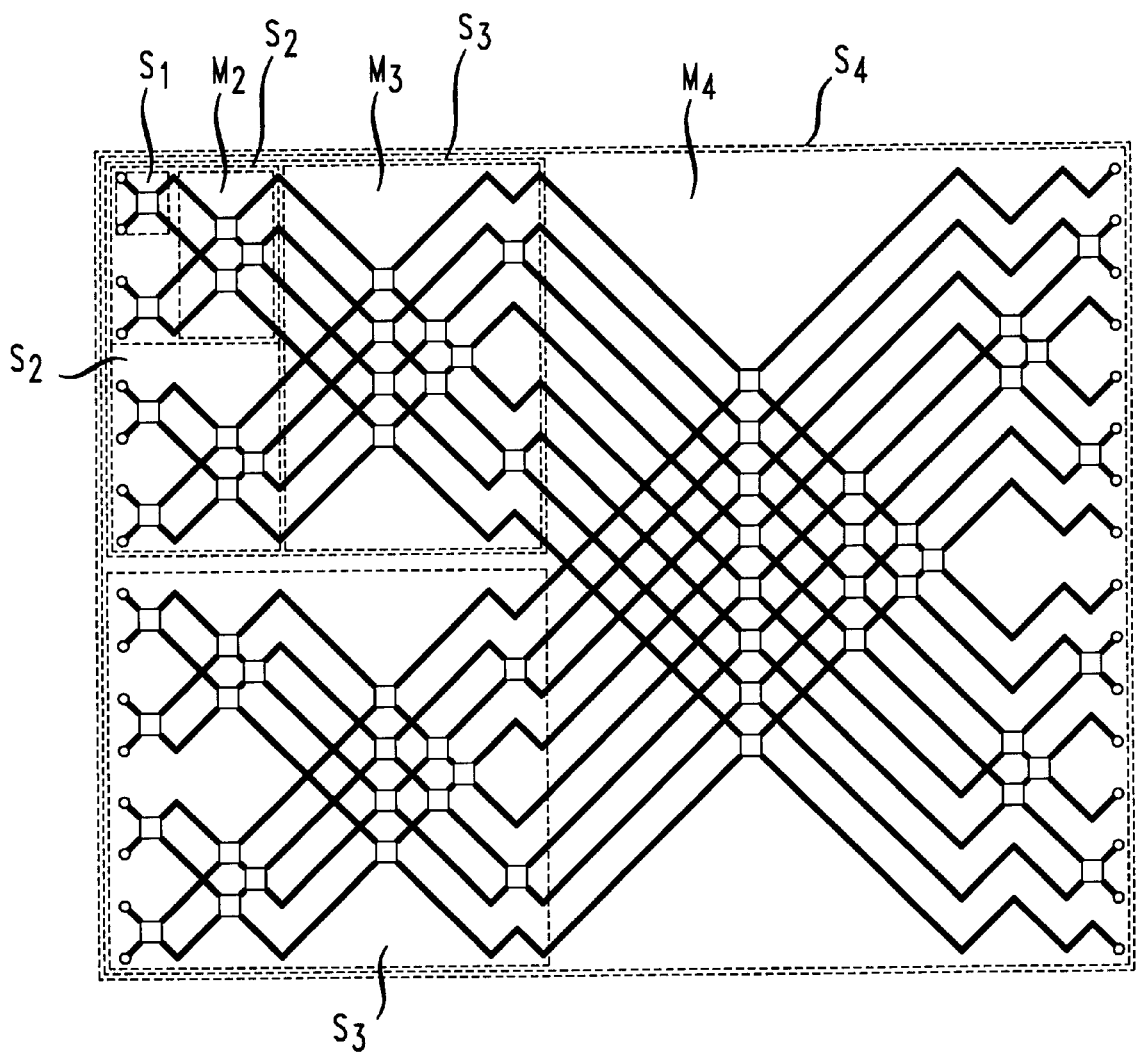
FIG. 7 shows a layout according to the present invention of the odd-even sorter for n=4.

A layout according to the present invention for complete odd-even sorter $S_n$ for n=4 is shown in FIG. 7. $S_1$ is a single comparison circuit. There are $\frac{1}{2} \cdot (2^n) = 8$ copies of $S_1$ for receiving $2^n=16$ inputs. $S_2$ consists of upper and lower $S_1$ sorters, the outputs of which are attached to odd-even merger $M_2$. There are four copies of $S_2$. Sorter $S_3$ consists of upper and lower $S_2$ sorters attached to odd-even merger $M_3$. Finally, $S_4$ consists of upper and lower $S_3$ sorters attached to odd-even merger $M_4$. It will now be appreciated that the odd-even sorter is comprised of odd-even mergers.

Those familiar with sorting networks will recognize that the present layout of the odd-even sorting network $S_n$ is distinct from previous layouts of Batcher's odd-even sorter in a number of aspects. Among other distinctions, the odd-even sorter is arranged in conic portions, includes links that are slanted, such as by 45°, and includes channel linking. Such features are unknown in conventional sorting network layouts, and result, among other benefits, in a lower layout-area than has hitherto been achieved.

Notwithstanding the significant differences in physical layout, the sorting network described by the present layout and Batcher's odd-even sorter are isomorphic. The term isomorphic, as used herein, is meant to indicate structural equivalence implying that the present sorter is characterized by the same depth, i.e; ½n(n+1), and number of comparison circuits, i.e., $o(N^2)$, as Batcher's odd-even sorter. For a further description of the term "isomorphic," as used in conjunction with networks generally, and, more particularly, as intended herein, see G. Bilardi entitled "Merging and Sorting Networks with the Topology of the Omega Network," IEEE Trans. Comp., v(38), no. 10, pp. 1396–1403, October 1989.

Notwithstanding the aforementioned isomorphism, the grid area required by the present layout is significantly less than that required for previous layouts of Batcher's odd-even sorter. The layout of $M_n$ is enclosed by a rectangle having a height $\sqrt{2} \cdot (2^n-1)$ grid segments. The width, w(n), can be computed recursively: $w(2)=2\sqrt{2}$ grid segments, and, for $n \geq 2$, $w(n+1)=w(n)+\sqrt{2} \cdot 3 \cdot 2^{n-2}$ grid segments. It follows that $w(n)=\sqrt{2} \cdot (3 \cdot 2^{n-2}-1)$ grid segments. Thus, the grid area of $M_n$ is bounded by $2 \cdot 2^n \cdot (3/4)2^n$ or $3/2N^2$ grid units. The layout of the complete odd-even sorter, $S_n$, follows the recursive construction previously described in this specification It is encompassed in a rectangle having a size $\sqrt{2} \cdot (2^n-1) \times \sqrt{2}(2^n+2^{n-1}-n-1)$. Thus, the grid area of $S_n$ is bounded by $2 \cdot 2^n \cdot (3/2)2^n$ or $3 N^2$ grid units.

Batcher's sorting networks have been used in a variety of applications. As sorters, such networks find application to computing. Due to their structure, such networks are particularly useful in parallel computing applications for instruction and/or data routing to corresponding processors or memory cells used in such applications. Additionally, since such networks function as self-routing switching networks, they are useful in a variety of communications applications, such as, for example, broad band ISDN as well as in conventional data and/or telecommunications networks. See Weste and Eshraghian, *Principles of CMOS VLSI Design*, Section 9.4, (Addison Wesley, 1985). The improved layouts described herein may be used advantageously, in the same applications, to minimize the area required to physically implement the sorting network on one or more integrated circuits.

Figure 8:
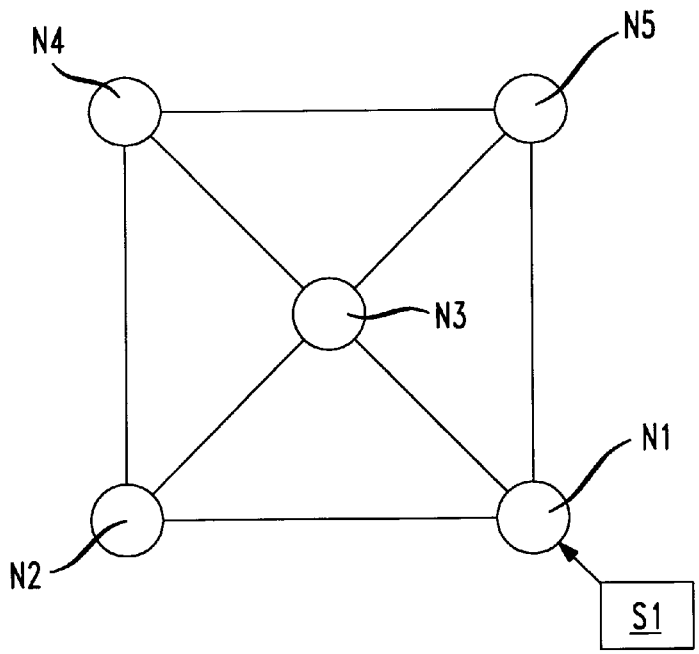
FIG. 8 shows a simplified diagram of a portion of an asynchronous transfer mode (ATM) network.

In the following nonlimiting example, improved layouts according to the present invention are used as the "switch fabric" of an asynchronous transfer mode (ATM) switch. FIG. 8 shows a portion of an ATM network having nodes N1–N5. In the example shown in FIG. 8, a single source S1 delivers data onto the network at N1 for delivery to other nodes in the network, such as nodes N2–N5. It should be appreciated that in other embodiments, such a network may receive data from multiple sources. Each of the nodes has an ATM node switch, not shown in FIG. 8, for routing data to other nodes in the network. A simplified diagram of an ATM node switch according to the present invention is shown in FIG. 9.

Figure 9:
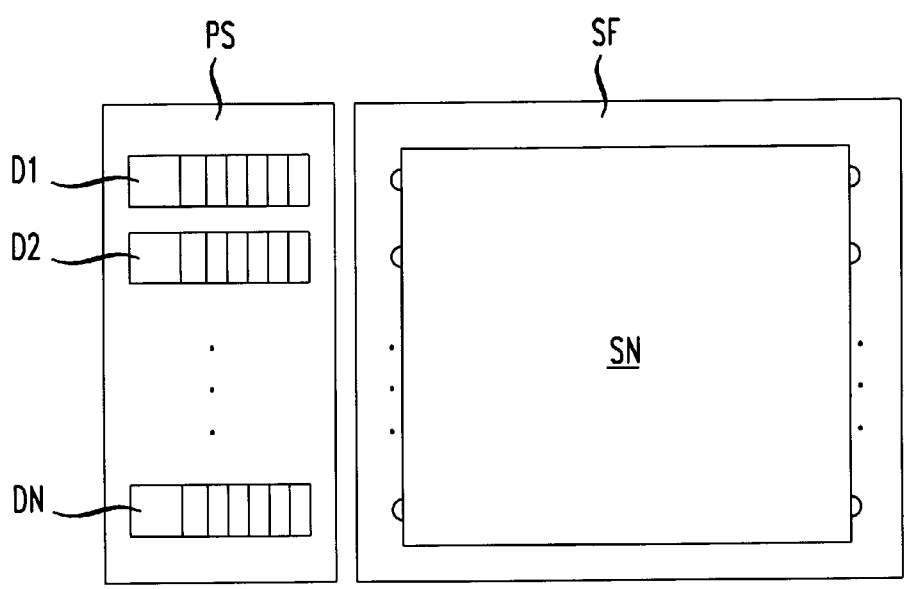
FIG. 9 shows a simplified diagram of an asynchronous transfer mode (ATM) switch.

As shown in FIG. 9, data packets D1–DN are received by the ATM node switch and stored in buffers for preprocessing in preprocessing stage PS. In addition to information content, the data packets include routing or address data indicating the intended destination of the information content. In the preprocessing stage PS, decisions are made by known methods concerning the order of data flow into switch fabric SF, which is a sorting network SN having an improved layout as described herein. From the buffers, the data is delivered synchronously into the switch fabric SF, and routed to the appropriate node.

Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

For example, the cones described herein have been defined to have a substantially triangularly-shaped perimeter and to have specifically-located symmetry axes. Moving one or more comparison circuits from a designated position may disrupt the substantially triangular shape of a cone's perimeter and/or skew its symmetry axis from the defined location. Such a modification is contemplated and is considered to be within the intended scope of the invention. It will be appreciated, however, that such deviations increase the grid area of a network layout.

Moreover, while the description of the odd-even network and its layout include network "inputs" and network "outputs," the inputs or outputs may not exist as such in some embodiments. For example, if two or more networks are linked together, the outputs of comparison circuits from the first of the linked networks can be directly linked to the inputs of comparison circuits in the second of the linked networks such that the second linked network does not possess discrete network inputs. Furthermore, while it is presently believed that slanting all links ±45 degrees relative to the columns of comparison circuits, i.e., ±45 degrees away from the vertical in FIGS. 6b–6d, provides the lowest grid area achieveable according to the present method, the present invention may be practiced by slanting the links by a lesser or greater amount, or by slanting some but not all the links, or by permuting the links in other ways.

I claim:

1. A sorting network for sorting an input vector of N signals, the signals representative of values, comprising:

N network input terminals for receiving the signals;

a plurality of comparison circuits, each comparison circuit having two inputs for receiving two of the signals and operable to sort the two received signals by directing the signal having the lesser of the representative values to a predetermined one of two outputs and directing the other signal to the other of the two outputs;

N network output terminals to which the sorted signals are delivered; and a plurality of links that connect a network input terminal to a comparison circuit input for each of the N network input terminals, and for connecting a first comparison circuit output to a second comparison circuit input or a network output terminal for each of the comparison circuits;

characterized in that, in a layout of the sorting network, the comparison circuits are arranged into at least a primary cone having a substantially triangularly-shaped perimeter.

2. The sorting network of claim 1, wherein the primary cone has a symmetry axis that falls on a line between a first and a second group of the input terminals.

3. The sorting network of claim 2, wherein the first and the second groups contain the same amount of input terminals.

4. The sorting network of claim 2, wherein a number of comparison circuits in the primary cone is N−1.

5. The sorting network of claim 2, wherein $N=2^n$, and further wherein the comparison circuits within the primary cone are arranged into n columns, and, wherein, the first column contains $2^{n-1}$ comparison circuits and the n-th column contains one comparison circuit.

6. The sorting network of claim 1, wherein the comparison circuits are arranged into at least a second and a third cone.

7. The sorting network of claim 6, wherein the N network input terminals are numbered in consecutive order, and further wherein the second cone has a symmetry axis falling between input N/4 and N/4+1, and wherein the third cone has a symmetry axis that falls between input 3/4N and 3/4N+1.

8. The sorting network of claim 1, wherein the network input terminals are arranged in a line, and further wherein a substantial portion of each link extends in a substantially non-orthogonal direction to the line.

9. The sorting network of claim 8 wherein the direction is 45 degrees.

10. The sorting network of claim 8 wherein the network is characterizable by a grid layout, and wherein the area of the grid layout of the sorting network is less than about 12 $N^2$ grid units.

11. The sorting network of claim 1 wherein the network is isomorphic to Batcher's odd-even network.

12. A sorting network characterized by an improved layout, the network configured for receiving an input vector of up to N signals, wherein at least a portion of each of the signals represent values, comprising:
  a plurality of comparison circuits, each comparison circuit having two inputs and two outputs, each comparison circuit operable to receive two signals and sort them according to their values and to deliver the signals in a sorted order to the two outputs, and each said comparison circuit having a network depth, the network depths having an order from minimum to maximum; and
  links for connecting the outputs of comparison circuits to the inputs of comparison circuits having a greater network depth; characterized in that
  the comparison circuits are arranged in columns, the columns collectively defining at least a primary cone, wherein, a first and a last comparison circuit in each column that defines the primary cone collectively define a substantially triangularly-shaped perimeter of the primary cone, and further wherein a substantial portion of each link extends in a substantially non-orthogonal direction to the columns.

13. An odd-even sorting network $S_n$ for sorting signals, wherein at least a portion of each of the signals represent values, the network having a recursive construction, wherein $S_{n+1}$ comprises:
  an upper sorter $S_n^1$ and a lower sorter $S_n^2$, each for sorting $2^n$ inputs, the upper and lower sorters operable, collectively, to provide two sorted vectors having a total length of $2^{n+1}$; and
  an odd-even merger $M_{n+1}$ having $2^{n+1}$ inputs attached to the $2^n$ outputs from each of the upper and lower sorters thereby receiving the sorted vectors therefrom, and operable to merge the two sorted vectors into a single sorted vector, the merger $M_{n+1}$ comprising:
    an upper odd-even merger $M_n^1$ and a lower odd-even merger $M_n^2$ for sorting odd-even vectors, wherein,
  the upper sorter $S_n^1$, the lower sorter $S_n^2$ and the odd-even merger $M_{n+1}$ are comprised of interconnected comparison circuits, and further wherein, the interconnected comparison circuits are arranged into at least one cone having a substantially triangularly-shaped perimeter.

14. The odd-even sorting network of claim 13, and further wherein, the merger $M_{n+1}$ contains $2^n-1$ cones.

15. A sorting network comprising a recursive arrangement of merger circuits, the sorting network physically configured for receiving an input vector of up to $N=2^n$ signals, wherein at least a portion of each of the signals represent values, comprising:
  merger circuits $M_1 \ldots M_n$, wherein, there are N/2 copies of $M_1$ and half as many copies of each successive merger so that there is one copy of $M_n$, the merger circuits collectively containing $n(n-1)2^{n-2}+2^{n-1}$ comparison circuits, each comparison circuit having two inputs and two outputs and operable to receive two signals and sort them according to their values and to deliver the signals in a sorted order to the two outputs; and
  a plurality of links, the links connecting each comparison circuit to at least one other comparison circuit; wherein, within each merger circuit $M_2 \ldots M_n$, $2^n-1$ comparison circuits are arranged into a primary cone, the primary cone having a substantially triangularly-shaped perimeter.

16. The sorting network of claim 15, wherein the merger $M_n$ further contains a first and a second recursive portion, each of which recursive portions comprise all comparison circuits within merger $M_{n-1}$, except for the first $2^{n-1}$ of the comparison circuits of said merger $M_{n-1}$, and wherein the comparison circuits in the first and second recursive portion are arranged into at least respective second and third cones; and
  channel links for conducting signals out of each cone, wherein, a first and a second portion of the channel links conduct signals from the primary cone to the second and third cones, and further wherein the first portion of channel links are straight, and the second portion of the channel links contain at least one bend.

17. The sorting network of claim 15, further comprising network inputs arranged in a column, wherein a substantial portion of each channel link extends in a substantially non-orthogonal direction to the column.

18. A method for laying out a sorting network having a plurality of comparison circuits, comprising;
  arranging comparison circuit into at least a primary cone defined by a perimeter having a substantially triangular shape, wherein, within said primary cone, said comparison circuits are arranged in columns such that each successive column has one half of the number of comparison circuits as the nearest preceding column; and
  linking each comparison circuit directly to at least one other comparison circuit by links, wherein a substantial portion of each link extends in a substantially non-orthogonal direction relative to said columns.

19. A switch for routing data signals to a network node, comprising:

a preprocessing stage for receiving the data signals including address information, and for ordering data signal flow; and a switch fabric that receives the ordered data signals from the preprocessing stage, the switch fabric including a sorting network operable to route the data signals to an appropriate network node based on the address information of the signal, the sorting network comprising:

network input terminals for receiving signals representative of values, and network output terminals for providing said received signals, but in sorted order;

a plurality of comparison circuits, each comparison circuit having two inputs and two outputs, each comparison circuit operable to receive two signals and sort them according to their values and to deliver the signals in a sorted order to the two outputs, wherein the comparison circuits are arranged into one or more cones, and further wherein the comparison circuits within at least one of the cones are arranged into at least two columns; and links for connecting each comparison circuit to at least one other comparison circuit, wherein a substantial portion of each link extends in a substantially non-orthogonal direction to the columns.

* * * * *